United States Patent [19]
Lussier et al.

[11] 3,985,640
[45] Oct. 12, 1976

[54] CRACKING WITH ZEOLITE CATALYSTS PROMOTED WITH URANIUM OR URANIUM PLUS SILVER

[75] Inventors: Roger Jean Lussier, Ellicott City; John Storey Magee, Jr., Cooksville, both of Md.

[73] Assignee: W. R. Grace & Co., New York, N.Y.

[22] Filed: Aug. 29, 1975

[21] Appl. No.: 609,318

[52] U.S. Cl. .............................. 208/120; 252/455 Z; 252/477 R
[51] Int. Cl.² ..................... C10G 11/04; B01J 29/12
[58] Field of Search ..................................... 208/120

[56] References Cited
UNITED STATES PATENTS

| | | |
|---|---|---|
| 3,788,977 | 1/1974 | Dolbear et al. ..................... 208/120 |
| 3,835,032 | 9/1974 | Dolbear et al. ..................... 208/120 |
| 3,929,621 | 12/1975 | Lussier et al. ..................... 208/120 |

*Primary Examiner*—Delbert E. Gantz
*Assistant Examiner*—G. E. Schmitkons
*Attorney, Agent, or Firm*—Kenneth E. Prince; Joseph P. Nigon; Arthur P. Savage

[57] ABSTRACT

Uranium oxide or uranium and silver oxides in combination with hydrogen or rare earth oxides are exchanged into zeolites as components of zeolite cracking catalysts to increase the olefin content of the gasoline and, thus, enhance the yield of high octane components as well as reduce the coking tendency of the catalyst.

5 Claims, No Drawings

CRACKING WITH ZEOLITE CATALYSTS PROMOTED WITH URANIUM OR URANIUM PLUS SILVER

BACKGROUND OF THE INVENTION

It is well known that zeolite promoted hydrocarbon cracking catalysts are highly active and selective for the production of gasoline from gas oil type feedstocks. The gasoline fractions that are produced by the zeolite catalyst possess moderate clear octane readings and generally require the addition of anti-knock components prior to being used as a motor fuel.

It is thus a primary objective of petroleum refiners to select catalysts and catalytic cracking conditions which maximize the formation of high octane gasoline components during the cracking process. The attempts to prepare these catalysts have not always been successful and sometimes have led to the preparation of catalysts that have undesirable characteristics such as low catalytic activity or high coke and hydrogen production.

U.S. Pat. 3,788,977 of Dolbear describes a process for preparing a catalyst that has an improved aromatic producing capability by impregnating an inorganic oxide base such as alumina with from about 1 to 20% uranium oxide generally in combination with about 0.01 to 1% platinum. The product recovered from the process described in this patent is best considered as an additive that might be used to increase the octane ratings so as to decrease the amount of tetraethyl lead required to enhance the anti-knock performance of the gasoline.

Typical zeolite promoters are described in the prior art and comprise hydrogen or rare earth exchange synthetic faujasites which have a silica to alumina ratio of about 2.5 to 6. These faujasites that are designated type X and type Y by the Linde Division of Union Carbide Corporation are prepared from synthetic faujasite and are generally available in the alkali metal form. To prepare the cracking catalyst additive the alkali metal faujasites are normally exchanged with solutions containing hydrogen and/or rare earth ions, subsequently calcined and finally washed or ammonium exchanged to reduce the soda level of the product to below about 0.5 weight percent. Typical rare earth exchange faujasites and the preparation thereof are disclosed in U.S. Pat. No. 3,402,996 to Maher et al.

U.S. Pat. No. 3,293,192 to Maher et al. discloses another type of treatment of the zeolites in which the zeolites are modified by thermal treatment.

Commercial cracking catalyst compositions which are readily available contain in addition to the zeolite promoter matrix type material such as amorphous silica, alumina and/or silica alumina hydrogels. The matrix component may also contain or comprise clay such as kaolin, or thermally or chemically modified clays such as metakaolin. These catalysts have a wide variety of commercial designation such as XZ-15, XZ-25, XZ-36, XZ-40, DZ-7, DZ-5 and other commercial designations.

BRIEF DESCRIPTION OF THE INVENTION

We have found that a gasoline having a higher than normal octane can be recovered by contacting a gas oil feed stock with a catalyst prepared by incorporating a faujasitic zeolite in the hydrogen or rare earth form exchanged with uranium or uranium in combination with silver ions, as the zeolite portion of the catalyst. The direct exchange of the uranium or uranium plus silver into the zeolite eliminates the need for a second promoter and improves the activity of the catalyst without the loss of octane enhancement that would result if the zeolite were exchanged with additional rare earth oxide.

DETAILED DESCRIPTION OF THE INVENTION

The first step in our process is the selection of the zeolite. The zeolite used in our novel process is the faujasite having a silica to alumina ratio of about 3 to 6 designated zeolite Y by the Linde Division of Union Carbide Corporation. This zeolite has an exchange capacity of approximately 5 mili equivalents per gram.

The second step of our process is the ion exchanging of the zeolite with ammonium sulfate solution to remove all but the last traces of sodium ion. This exchange is normally carried out with a 10% ammonium sulfate solution. The exchange is carried out over a period of 1 hour. After this exchange the zeolite is separated from the ammonium sulfate solution and washed to remove traces of the ammonium salts. When the zeolite is in the ammonium form it is then exchanged with a 1 to 10 weight % uranium nitrate $(UO_2(NO_3)_2)$. The next step of the process is calcination of the zeolite. The zeolite is calcined for periods of 1 to 4 hours at temperatures of 1350° to 1450° F. with calcination for 3 hours at 1400° F. being preferred. The zeolite is then ready to be incorporated into the cracking catalyst. The zeolite contains 1 to 10 weight percent uranium calculated as U.

When the zeolite contains both urania and silver the first step of the process is again ion exchanging with ammonium sulfate solution to remove all but the last traces of sodium ion. The second step is exchange with a solution containing both silver nitrate $(AgNO_3)$ and uranium nitrate $(UO_2(NO_3)_2)$. The exchange is carried out with a mixed solution containing 1 to 10% of silver nitrate and 1 to 10% uranium nitrate. The zeolite is then calcined for periods of 1½ to 4 hours at temperatures of 1350° to 1400° F. with a calcination for 3 hours at 1400° F. being preferred.

When the final product is in the rare earth form the first step of the process is again ion exchanging with ammonium sulfate to remove all but about 3% of the $Na_2O$. After this ammonium sulfate exchange the zeolite is exchanged with a solution containing 5 to 12 weight percent of rare earth salts preferably rare earth chloride after two ammonium sulfate exchanges. The zeolite is then calcined for 1 to 4 hours at 1000° to 1400° F., exchanged 2 times with 10% $(NH_4)_2SO_4$ solutions, and then exchanged with a mixed solution of silver nitrate and uranyl nitrate and calcined for a period of 1½ to 4 hours at temperatures of 1350° to 1400° F. with a calcination for 3 hours at 1400° F. being preferred.

After the zeolite is prepared in the desired form it is incorporated into a cracking catalyst. The zeolite is incorporated as about 10 to 20 weight percent of the catalyst and is incorporated into a matrix such as a semi-synthetic cracking catalyst matrix that contains 1 part of kaolin clay and 2 parts of an amorphous silica alumina catalyst containing 25% alumina.

The zeolite can of course be incorporated into other matrices such as silica, silica alumina, silica zirconia, silica magnesia, and so forth. The zeolite is normally mixed with the matrix material using the conventional techniques well known in the prior art.

Catalyst compositions which comprise the zeolite promoted catalyst containing the urania plus hydrogen or urania and silver oxide plus hydrogen or urania and silver oxide plus rare earth are utilized in conventional catalytic cracking processes. These processes involve the contact of a hydrocarbon feedstock which typically possesses a boiling range in the order of 400° to 1000° F. under cracking conditions and temperature on the order of 800° to 1000° F. During the cracking reaction the initial feedstock is converted to components of lower molecular weight including gasoline fractions and small amounts of hydrogen and coke. The catalyts of the present invention possess activities in commercial units on the order of 60–75% conversion and the selectivity is such that the aromatic content of the cracked products is substantially increased without a substantial increase in the production of dry gas or coke fractions.

As will be indicated by the subsequent examples the increase in the aromatic product obtained from the present catalyst compositions is readily detected through the use of nuclear magnetic resonance (NMR) technique which measures the concentration of aromatic hydrocarbons present in the products of the catalytic reaction. The olefins and the isobutane to normal butane ratios were measured by gas chormatographic techniques.

The octane ratings of the gasoline produced by the catalytic reaction are related to the amount of aromatic content as shown by E. F. Schwarzenbek et al., Proceedings of the Third World Petroleum Congress, Section IV, 19.

The catalyst is evaluated by comparing the activity of these catalysts with the activity of a standard catalyst containing calcined rare earth faujasite in the hydrogen form. In this comparison both catalysts are subjected to the standard activity test described by Ciapetta and Henderson in the Oil and Gas Journal of Oct. 16, 1967 at pages 88–93. This procedure for comparing the activity of our catalyst with the standard catalyst is used to obtain the data set forth in the following examples.

Our invention is illustrated by the following specific but non-limiting examples.

EXAMPLE 1

This example illustrates the method of preparing the faujasite containing urania and hydrogen.

A quantity of a faujasitic zeolite having a silica to alumina ratio of about 5.0 was ion exchanged with a 10% solution of ammonium sulfate to remove all but the last traces of the sodium ion. The zeolite was then exchanged with a uranyl nitrate solution prepared to contain 120 grams of $UO_2(NO_3)_2$ per liter. The exchanged zeolite was then calcined for 3 hours at 1400° F.

EXAMPLE 2

This example illustrates a method for preparing the zeolite wherein the zeolite contained both silver oxide and urania in combination with a rare earth oxide.

A quantity of a faujasitic zeolite having a silica to alumina ratio of about 4.5 was ion exchanged with an ammonium sulfate solution prepared to contain 100 grams of ammonium sulfate per liter to reduce the $Na_2O$ level to 3%. The zeolite was then exchanged with a rare earth chloride solution that contained 2.1 grams of the salt per 100 ml. and then calcined 3 hours at 1000° F. The zeolite was then exchanged to low $Na_2O$ with 10% $(NH_4)_2SO_4$ solutions and then with a solution of silver nitrate and uranyl nitrate. After the exchange was complete the zeolite was calcined for 3 hours at 1400° F.

EXAMPLE 3

The zeolite prepared by the process described in Example 1 was incorporated into a semi-synthetic cracking catalyst matrix. The matrix contained 1 part of kaolin clay to 2 parts of silica alumina containing 25% alumina. The zeolite was added in concentrations of 10 and 15 weight percent. Upon drying the resultant catalyst was ground, pilled and steamed for 8 hours at 1350° F. with steam at a pressure of 15 p.s.i.g. The steamed catalysts were tested for activity by cracking gas oil in a microactivity apparatus operated at 920° F. and a weight hourly space velocity of 16. The catalyst oil ratio was 5.8 to 1. The cracked gas oil was analyzed for the olefin content in the $C_6$ fraction and for the percentage of coke. The data is set out in Table 1 below.

Table I

| Faujasitic Zeolite Used | Volume Percent Conversion | Percent Coke | Percent Olefins in $C_6$ Product |
|---|---|---|---|
| 10 wt. % U | 78 | 1.76 | 13.5 |
| Calcined Rare Earth Faujasite | 78.5 | 2.43 | 9.7 |
| 15 wt. percent U | 82.2 | 2.20 | 11.0 |
| Calcined Rare Earth Faujasite | 81.5 | 3.03 | 8.0 |

It is apparent from review of these data that the zeolite containing 10 and 15 weight percent exchange urania had substantial improvement in the percentage of olefins in the $C_6$ product and a substantial reduction in the percentage of coke formed in the cracking reaction.

EXAMPLE 4

The zeolite prepared according to the process described in Example 2 was incorporated into a semi-synthetic matrix using the same techniques as described in Example 3 above. Upon drying the resultant catalysts were ground, pilled and steamed for 8 hours at 1350° F. using steam at a pressure of 15 p.s.i.g. The steamed catalyst were tested for activity by cracking gas oil in a microactivity apparatus operated at a temperature of 920° F. and weight hourly space velocity of 16. The catalyst to oil ratio was 5.8 to 1. The cracked gas oil was analyzed for the $C_6$ olefin content and the Iso $C_4$ to normal $C_4$ ratio. The aromatic content was determined by nuclear magnetic resonance. The data is presented in the table II below.

Table II

| Faujasitic Zeolite Used | Volume Percent Conversion | Percent Olefins in $C_6$ Product | Percent Aromatics | Iso $C_4$ To Normal $C_4$ Ratio |
| --- | --- | --- | --- | --- |
| Ag/U/Re$_2$O$_3$ (10/5/5) | 74.4 | 20.1 | 16.1 | 7.2 |
| Calcined Rare Earth Faujasite | 75.7 | 12.4 | 14.5 | 5.2 |
| Ag/U (10/5) | 71.2 | 23.2 | 14.7 | 7.5 |
| Calcined Rare Earth Faujasite | 70.3 | 15.2 | 12.0 | 5.2 |
| Ag/U/Re$_2$O (7.5/5/8) | 79.7 | 12.8 | 19.3 | 6.5 |
| Calcined Rare Earth Faujasite | 78.5 | 9.7 | 14.6 | 5.5 |

It is obvious from a review of these data that the silver urania exchanged zeolite had substantial improvement in olefin production, aromatic production and in the ratio of isobutane to normal butane.

EXAMPLE 5

A series of runs were completed in which the catalysts prepared according to the process described above were compared in a pilot unit operated at a temperature of 920° F. and varying weight hourly space velocities. The products prepared by the process of the instant application were compared with a catalyst prepared to contain 10 weight percent of a calcined rare earth oxide plus 10 weight percent of urania on gamma alumina. The products were also compared with catalyst prepared to contain 11% calcined rare earth faujasite and 30% of faujasite in the hydrogen form. The volume percent conversion at various weight hourly space velocities and the research octane number (clear) of the gasoline recovered were determined. The pilot unit was operated at a temperature of 920° F.

The data collected is set out in Table III below.

Table III

| Faujasitic Zeolite Used | Volume Percent Conversion | Weight Hourly Space Velocity | Research Octane Number (Clear) |
| --- | --- | --- | --- |
| 10% calcined Rare Earth form 10% UO$_3$ on gamma alumina (1) | 71.4 | 40 | 86.0 |
| 11% calcined Rare Earth form | 72.5 | 40 | 86.4 |
| 30% faujasite-hydrogen form | 70 | 20 | 87.8 |
| 12% Urania-hydrogen (2) | 73 | 20 | 87.2 |
| 8% Ag U Re$_2$O$_3$ (10,5,12) (3) | 70 | 40 | 91.6 |
| 10% Ag Re (10,8) | 61 | 20 | 91.6 |

(1) The final catalyst contained 1.81% Re$_2$O$_3$ and 1.29% U.
(2) The final catalyst contained 0.77% Re$_2$O$_3$, 0.53% Ag and 0.31% U.
(3) The final catalyst contained 1.51% U.

It is apparent from a review of these data that the catalysts prepared according to the process of our invention has substantially better research octane number than the catalyst used as a standard. The improvement resulting from incorporating the urania in the zeolite by exchange rather than by adding the uranium as a component on gamma alumina is evident by the improvement in the research octane number of the catalyst containing only exchanged urania and hydrogen relative to the catalyst containing urania on gamma alumina and a calcined rare earth faujasite or the calcined rare earth faujasite alone. There is an improvement in a research octane number even though the catalyst contained no rare earth. Addition of urania to a hydrogen, silver or silver + rare earth faujasite increases the zeolite activity level. Increasing the rare earth level also increases activity, but reduces the octane advantage.

What is claimed is:

1. A method of catalytically converting hydrocarbons to produce gasoline of increased aromatic content which comprises contacting a hydrocarbon feedstock in the absence of added hydrogen at a temperature of 800° to 1000° F. with a catalyst consisting essentially of 5 to 50 percent by weight of a crystalline zeolite having a silica to alumina ratio of 2.5 to 6, dispersed in an inorganic matrix in which from 5 to 15 percent urania, silver or mixtures thereof are incorporated into the zeolite by ion exchange.

2. The process according to claim 1 wherein the crystalline zeolite is in the hydrogen form prior to exchange with a silver, uranium or mixed silver and uranium salt solutions.

3. The process according to claim 1 wherein the crystalline zeolite is in the rare earth form prior to exchange with the uranium or silver or mixed uranium and silver salt solutions.

4. The process according to claim 1 wherein the feedstock is a gas oil boiling in the range of 400° to 1000° F.

5. The process according to claim 1 wherein said inorganic matrix is a mixture of silica-alumina and clay.

* * * * *